H. Cash,
Sash-Cord Guide.
N°. 67,412. Patented Aug. 6, 1867.

Witnesses:
H. G. Webber.
Sam'l Knight.

Inventor:
Henry Cash
by
Knight Bros. Attorneys

United States Patent Office.

HENRY CASH, OF NEWPORT, KENTUCKY.

Letters Patent No. 67,412, dated August 6, 1867.

---

IMPROVED SASH-PULLEY.

---

The Schedule referred to in these Letters Patent and making part of the same.

---

TO WHOM IT MAY CONCERN:

Be it known that I, HENRY CASH, of Newport, Campbell county, Kentucky, have invented a new and useful Sash-Pulley; and I hereby declare the following to be a full, clear, and exact description thereof, reference being had to the accompanying drawings, making part of this specification.

This invention consists in a novel form of sash-pulley, adapted to be fastened on the rear or inner side of the pulley-stile, so as to greatly economize the cost both of manufacture and attachment.

Figure 1:
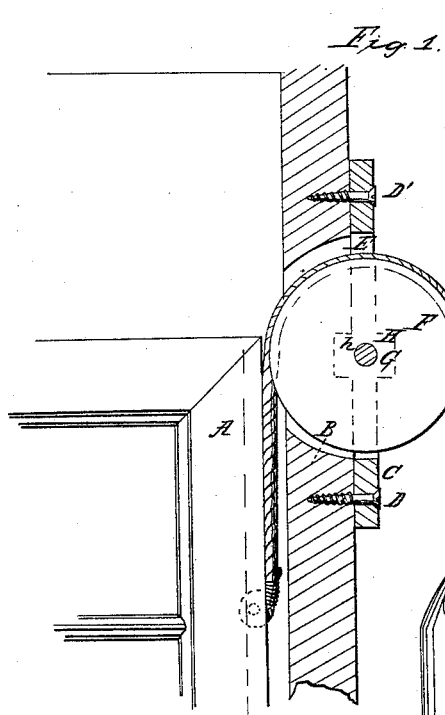
Figure 1 is a section on the plane of the sash, showing my pulley in position.
Figure 2:
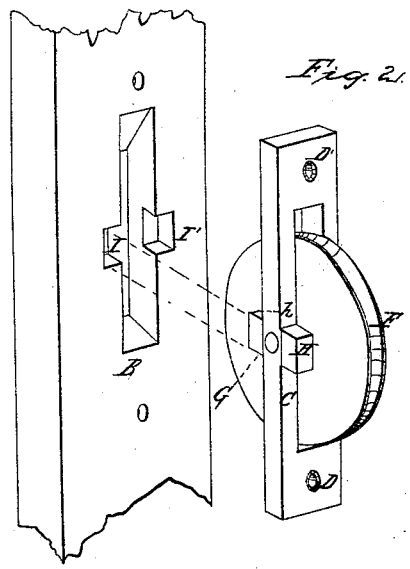
Figure 2 is a perspective view of the pulley and a portion of the stile detached.
Figure 3:
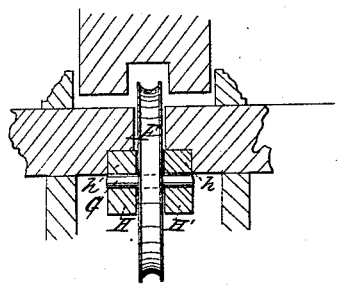
Figure 3 is a horizontal section of the pulley, with a portion of the box and sash.

A and B represent, respectively, portions of a sash, and one of the pulley-stiles, of ordinary construction. The customary face-plate and guards, adapted to be let in flush with the front of the pulley-stile, are in my improvement replaced with a simple rough casting, C, traversed by holes D D′ for the passage of wood-screws, whereby it is secured to the rear side of the pulley-stile, and by a slot, E, to contain the sheave F. It is also perforated athwart its width, to receive an axle, G, for the sheave, which axle is secured in place by being riveted at both ends. Bosses H H′ h h′, projecting rectangularly from the two faces of the plate C, serve the twofold purpose of affording substance to the plate around the perforation for the axle, and of shoulders, which, entering suitable gains, I I′, in the back of the stile, assume the entire vertical stress of the sash, and relieve the wood-screws of all duty except that of simply holding the plate in place. The screw-holes being countersunk at both ends, and the bosses projecting equally on both sides of the plate, and the sheave being journalled at precisely the mid-thickness of the plate, the pulley can be attached indifferently, with either side toward the stile.

This form of sash-pulley possesses several manifest advantages over the common one; for example, being adapted for attachment to the rear side of the stile, the latter has not to be laboriously almost cut away for the reception of the face-plate, which, besides seriously weakening the stile, involves considerable skill and labor. The only excavation in the stile is that for the pulley merely, which can be made by a rotary cutter or by a common centre-bit, and the two gains for the bosses. The pulley, in its simplest form, contains but three pieces, namely, the plate, the sheave, and the axle, whereas the common form contains not less than six pieces, to wit, the face-plate, the guards, the sheave, and the two rivets. My improvement, may, however, be provided with guards, if desired. Another benefit is the large size of the sheave admissible, and its considerable projection into the box, thus holding the counterbalance well clear of the back side of the stile.

I claim, as a new article of manufacture—

The combination of the flat plate C, pivot G, and sheave F, the said plate being provided with bosses H and all constructed and adapted to operate as and for the purposes described.

In testimony of which invention I hereunto set my hand.

HENRY CASH.

Witnesses:
GEO. H. KNIGHT,
JAMES H. LAYMAN.